(12) United States Patent
Jayaram

(10) Patent No.: US 10,984,399 B2
(45) Date of Patent: Apr. 20, 2021

(54) DYNAMICALLY CONFIGURABLE SOCIAL MEDIA PLATFORM

(71) Applicant: Snap, Inc., Santa Monica, CA (US)

(72) Inventor: Krish Jayaram, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 135 days.

(21) Appl. No.: 16/051,067

(22) Filed: Jul. 31, 2018

(65) Prior Publication Data
US 2020/0042968 A1 Feb. 6, 2020

(51) Int. Cl.
| G06Q 30/00 | (2012.01) |
| G06Q 20/12 | (2012.01) |
| G06Q 30/02 | (2012.01) |
| H04L 12/58 | (2006.01) |
| G06Q 20/24 | (2012.01) |
| G06Q 50/00 | (2012.01) |
| G06Q 20/32 | (2012.01) |

(52) U.S. Cl.
CPC .......... *G06Q 20/123* (2013.01); *G06Q 20/24* (2013.01); *G06Q 20/3276* (2013.01); *G06Q 30/0207* (2013.01); *G06Q 30/0234* (2013.01); *G06Q 50/01* (2013.01); *H04L 51/32* (2013.01)

(58) Field of Classification Search
CPC .. G06Q 20/123; G06Q 30/0207; G06Q 20/24; G06Q 50/01; G06Q 20/3276; H04L 51/32
USPC ...................................................... 705/14.1
See application file for complete search history.

(56) References Cited

U.S. PATENT DOCUMENTS

| 10,503,264 B1 * | 12/2019 | Blachly .................. G06F 3/041 |
| 2004/0122736 A1 * | 6/2004 | Strock .................... G06Q 30/02 |
| | | 705/14.31 |
| 2012/0005076 A1 * | 1/2012 | Dessert .................. G06Q 20/32 |
| | | 705/39 |

(Continued)

FOREIGN PATENT DOCUMENTS

| WO | 2015168498 | 11/2015 |
| WO | WO-2020028575 A1 | 2/2020 |

OTHER PUBLICATIONS

"International Application Serial No. PCT US2019/044517, International Search Report dated Nov. 15, 2019", 3 pgs.

(Continued)

*Primary Examiner* — Luis A Brown
(74) *Attorney, Agent, or Firm* — Schwegman Lundberg & Woessner, P.A.

(57) ABSTRACT

Disclosed is an electronic commerce system integrated with a social networking system. In some aspects, a user of the social networking system may claim a merchant offer by scanning a visual code identifying the offer. Later, the user may make a purchase at the merchant using the social network application. The social network application may apply the offer to the purchase transaction, and authorize a payment based on application of the offer to the purchase. One or more features of the social networking system may also be associated with the offer, such that these features become available to the user within the social network system upon use of the offer as part of the purchase transaction. For example, in some aspects, additional image filters may be made available within the social network system as a result of redemption of an offer.

18 Claims, 15 Drawing Sheets

(56) References Cited

U.S. PATENT DOCUMENTS

| | | | | |
|---|---|---|---|---|
| 2012/0221391 | A1* | 8/2012 | Wolf | G06Q 30/0234 705/14.17 |
| 2013/0024364 | A1* | 1/2013 | Shrivastava | G06Q 20/38 705/39 |
| 2013/0026241 | A1* | 1/2013 | Sakahashi | G06K 19/06056 235/494 |
| 2013/0046610 | A1* | 2/2013 | Abraham | G06Q 30/00 705/14.35 |
| 2013/0181045 | A1* | 7/2013 | Dessert | G06Q 30/0601 235/383 |
| 2014/0095275 | A1* | 4/2014 | Fosback | G06Q 30/0207 705/14.1 |
| 2014/0214515 | A1* | 7/2014 | Quirk | G06Q 30/0225 705/14.26 |
| 2015/0302474 | A1* | 10/2015 | Lampert | G06Q 30/0255 705/14.53 |
| 2016/0027042 | A1* | 1/2016 | Heeter | G06Q 30/0248 705/14.47 |
| 2016/0085863 | A1* | 3/2016 | Allen | G06Q 30/08 707/754 |
| 2016/0203586 | A1* | 7/2016 | Chang | G06K 9/48 382/260 |
| 2016/0359948 | A1* | 12/2016 | Raabe | H04L 67/02 |
| 2017/0116590 | A1* | 4/2017 | Ozawa | G06Q 20/3276 |
| 2017/0263029 | A1* | 9/2017 | Yan | G06F 3/04845 |
| 2018/0068293 | A1* | 3/2018 | Dunne | G06Q 20/3223 |
| 2018/0131878 | A1* | 5/2018 | Charlton | H04N 5/272 |
| 2018/0143748 | A1* | 5/2018 | Ahmed | H04N 21/4312 |
| 2018/0293562 | A1* | 10/2018 | Squire | G06Q 20/3276 |
| 2018/0348815 | A1* | 12/2018 | Popalis | G03B 17/40 |
| 2018/0373858 | A1* | 12/2018 | Farkash | G06K 9/00671 |
| 2020/0042968 | A1* | 2/2020 | Jayaram | G06Q 20/24 |
| 2020/0336454 | A1* | 10/2020 | Grantham | H04L 51/32 |

OTHER PUBLICATIONS

"International Application Serial No. PCT US2019/044517, Written Opinion dated Nov. 15, 2019", 7 pgs.

"International Application Serial No. PCT/US2019/044517, International Preliminary Report on Patentability dated Feb. 11, 2021", 9 pgs.

* cited by examiner

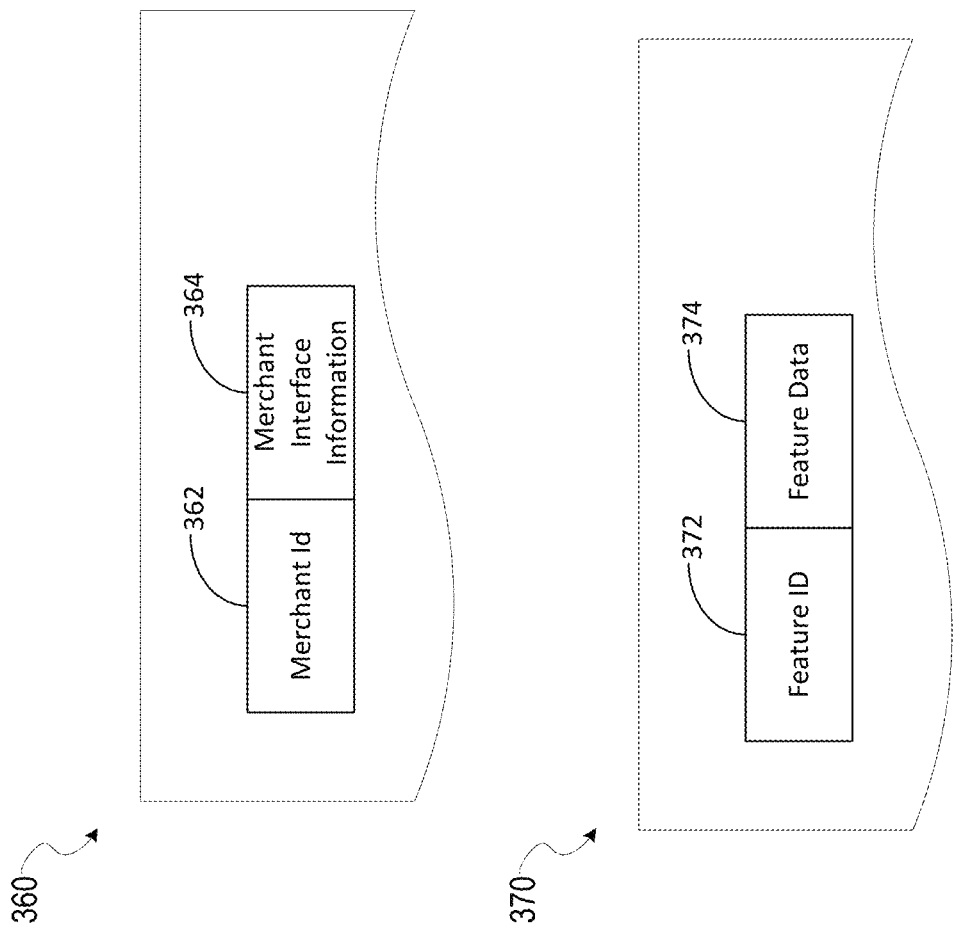

DYNAMICALLY CONFIGURABLE SOCIAL MEDIA PLATFORM

TECHNICAL FIELD

The present disclosure generally relates to the technical field of social networking. In particular methods, systems, and devices for facilitating ecommerce transactions via a social network are disclosed.

BACKGROUND

Social networking's role in a user's daily activity is expanding. Initially, social networking was a way to keep in touch with friends by sharing messages and other content, such as photos. Soon, social networking became a way to also obtain information from a variety of content sources, such as news, weather, and other information. Users enjoy a single unified interface from which they may achieve many of their electronic tasks, without being required to switch applications or learn multiple use paradigms to accomplish these tasks. Use of social networks for payment processing is a recent development that further unifies the computing interface for users. As users continue to take advantage of these new capabilities, improved methods of integrating social networks with payment processing are desired.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIG. 4B shows an example relational design for a portion of the database 120.

DETAILED DESCRIPTION

Figure 1:
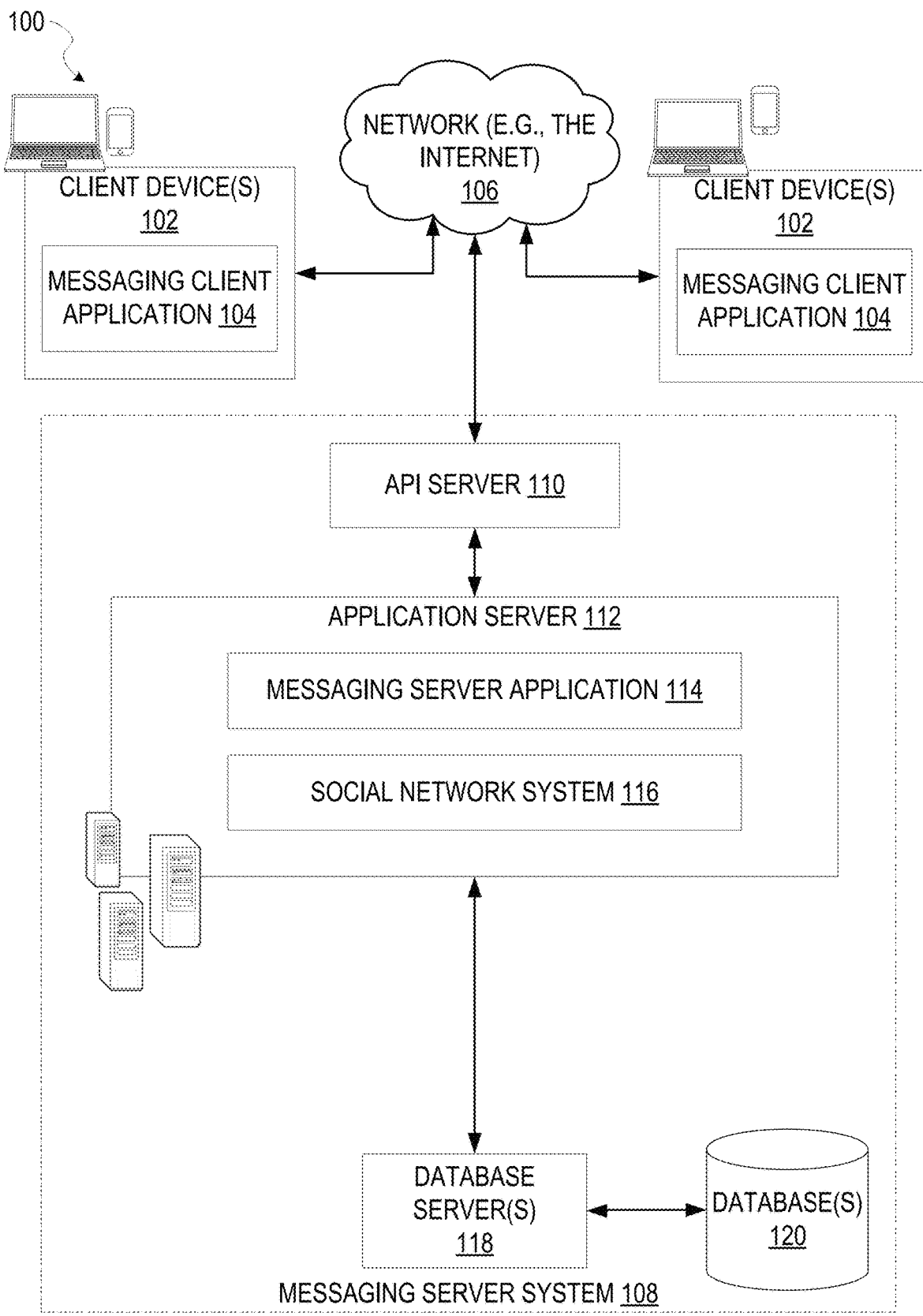
FIG. 1 is an exemplary block diagram of a messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

QR codes, and other optical barcodes (e.g., Universal Product Code (UPC) barcodes, Aztec code, Data Matrix, Dataglyph, MaxiCode, PDF417, Ultra Code), are a convenient way to share small pieces of information with users of mobile devices, wearable devices, and other smart devices. For instance, QR codes are two-dimensional optical barcodes that encode information readable by a device (e.g., a smart phone) equipped with a camera sensor.

To further increase the integration between payment processing systems and social networks, the disclosed embodiments present a technical solution that may, in some aspects, selectively enable various social networking features in response to activity within the payment system. As one example, a user may take advantage of a promotion offered by a merchant by first capturing an image of the promotion using a camera of their mobile device. Upon capturing the image, the mobile device may upload identifying information for the offer, such as a code encoded in the image of the promotion, to a social network. The social network may then map the code to a prearranged offer at a particular merchant. Information indicating the user has chosen to capture the offer with the camera of their mobile device is recorded within the user's information on the social network.

At some later time, the user may patronize the merchant, and when making a purchase, make the purchase using a payment system integrated with the social network. As part of completing the purchase transaction, the social network may communicate with merchant systems. From this communication, the social network may determine an amount of the transaction, and may communicate to the merchant an authorization of payment for the transaction.

The social network, when processing the purchase transaction, may also take note of the user's prior interest in the offer at the merchant. In response, the purchase transaction may be made in accordance with the offer. For example, if the offer was for a particular discount, the discount may be applied to the purchase transaction. If the offer provided for free merchandise when redeemed, the user may be notified that the free merchandise is available to them. When the merchant has completed their portion of the purchase transaction, in some aspects, they may notify the social network that their portion of the transaction is complete. In addition, the merchant may identify one or more features of the social network that may now be enabled for the user as a result of the user completing the purchase transaction (and redeeming the offer) at the merchant.

Features enabled by the merchant may enhance the user's experience while using the social network, and may also, in some cases, accomplish certain business objectives for the merchant. For example, if the merchant is sponsoring a particular event that the user may be attending, the merchant may make one or more image filters available to the user after the user completes the transaction at the merchant. In some aspects, the filter(s) may be responsive to a geographic location of the user's mobile device. For example, if the filter(s) are applied to an image while the mobile device is within a proximity of the event sponsored by the merchant, the filters may add additional visual indicators to the image. In some aspects, the filters may also add an offer associated with the merchant to the image. Thus, if the user chooses to share the image with friends on the social network, their friends may then also be able to take advantage of the offer.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

Methods, devices, and systems disclosed herein may provide the social messaging system 100 with ecommerce functions for products provided by the social network provider, and also for products provided by entities not closely affiliated with the social network provider. For example, separate corporations or separate organizations, with no common ownership, may provide products for sale within a native user interface of the social network system 116. A user of the social messaging system 100 may utilize the user interface native to the social messaging system 100 to perform ecommerce functions for these products, resulting in an easier to use ecommerce system, when compared to traditional social networking systems that may require a transition from a user interface of the social networking system to a separate ecommerce application when purchasing products provided by the separate organization or entity.

Figure 2:
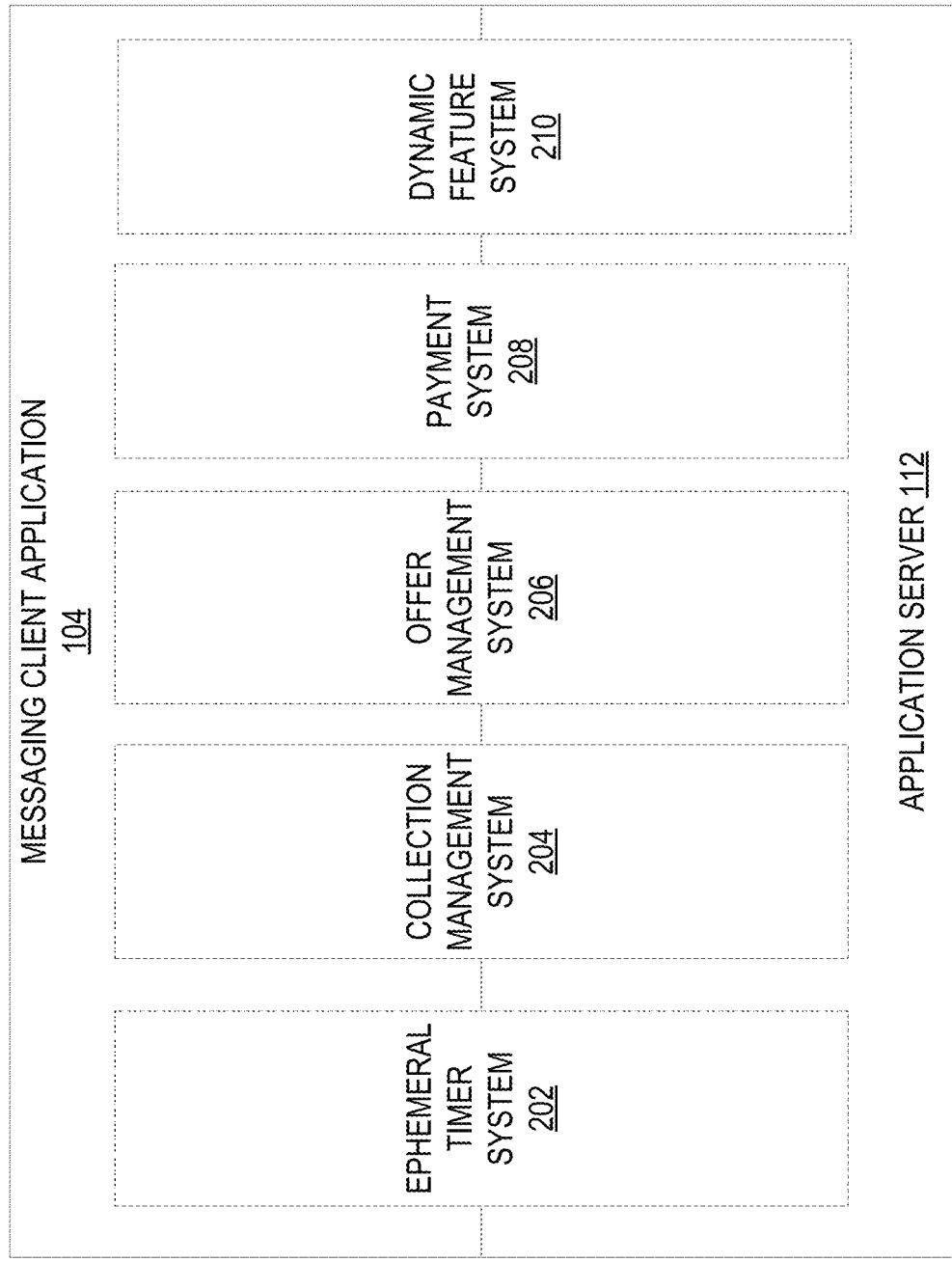
FIG. 2 is block diagram illustrating further details regarding the messaging system, according to some embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of subsystems, namely an ephemeral timer system 202, a collection management system 204, an offer management system 206, a payment system 208, and a dynamic feature system 210.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The offer management system 206 may managed data associated with offers that may be provided by the social network system 116. Offers may be associated with a particular merchant, and may provide one or more benefits when a user of the social network system 116 transacts with the merchant. For example, an offer may provide for a discounted price at the merchant. In some aspects, an offer may provide for an accumulation of loyalty points with the merchant, or may provide free merchandise from the merchant in association with a purchase transaction. The offer management system 206 may store information relating to offers provided by the social network system 116. This information is discussed below with respect to FIG. 4A.

The payment system 208 may provide for payment processing within the social network system 116. The payment system 208 may, for example, interface with one or more merchants that support offers via the social network system 116. The payment system 208 may capture transaction codes that may be scanned by a client device 102. The payment system 208 may interface with merchants to determine an amount associated with the transaction. The payment system 208 may also apply one or more offers to the transaction to determine a discounted amount for the transaction. The payment system 208 may further authorize the merchant to charge a credit card stored in the payment system 208 for an authorized amount.

The dynamic feature system 210 may selectively enable various features of the social network system 116. In some aspects, the features may be selectively enabled based on information received from the offer management system 206. For example, in some aspects, when an offer managed by the offer management system 206 is redeemed by a user of the social network system 116, the dynamic feature system 210 may configure the social network system 116 to make additional image filters available to the user. As one operative example, redeeming an offer at a popular grocery store may enable an image filter for the user, with the image filter configured to add the grocery store's logo to an image provided by the user.

Figure 3:
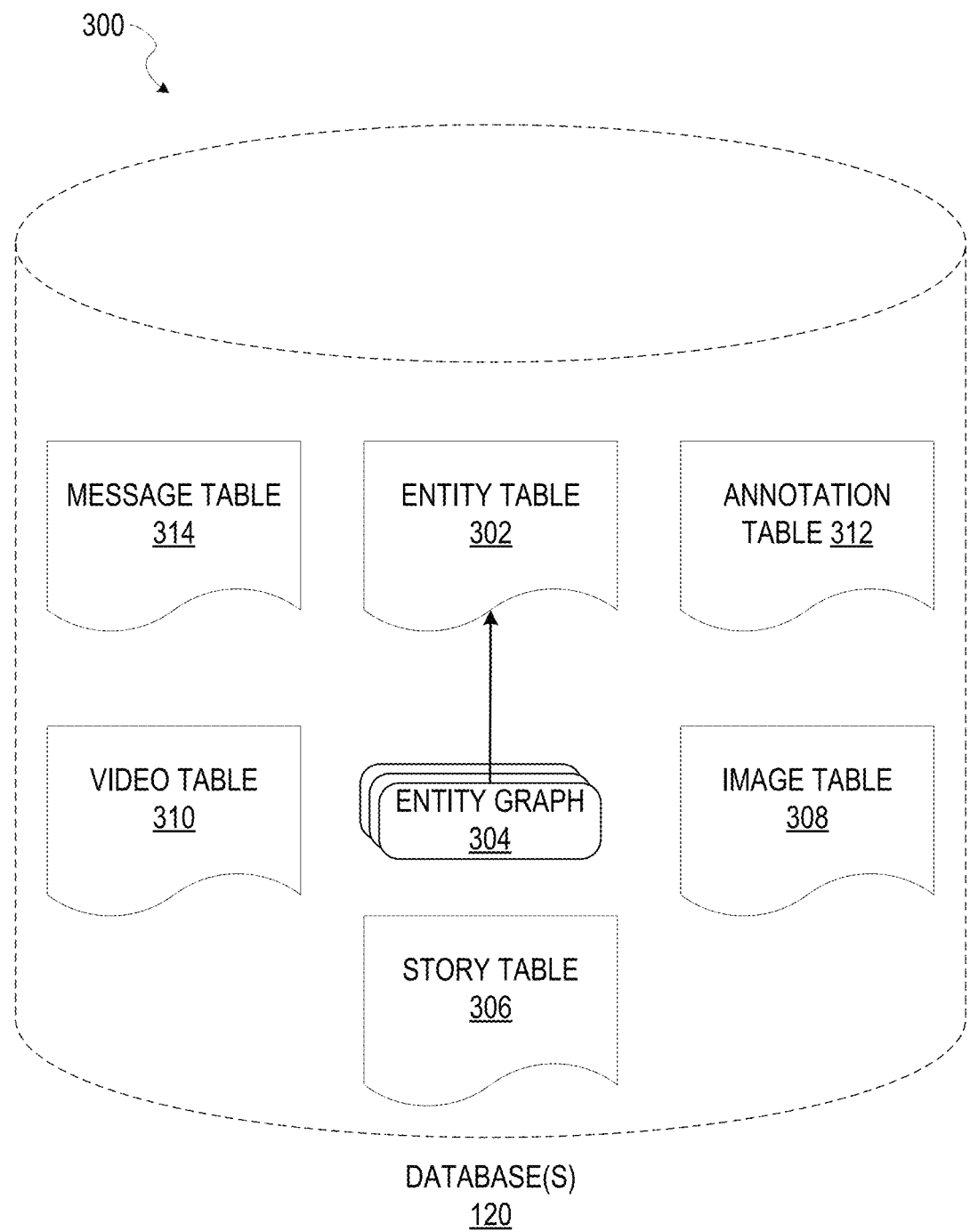
FIG. 3 shows exemplary data bases utilized by the messaging system of FIG. 1.

FIG. 3 is a schematic diagram 300 illustrating data which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 614. An entity table 602 stores entity data, including an entity graph 304. Entities for which records are maintained within the entity table 602 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 608 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., a user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and who are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4A:
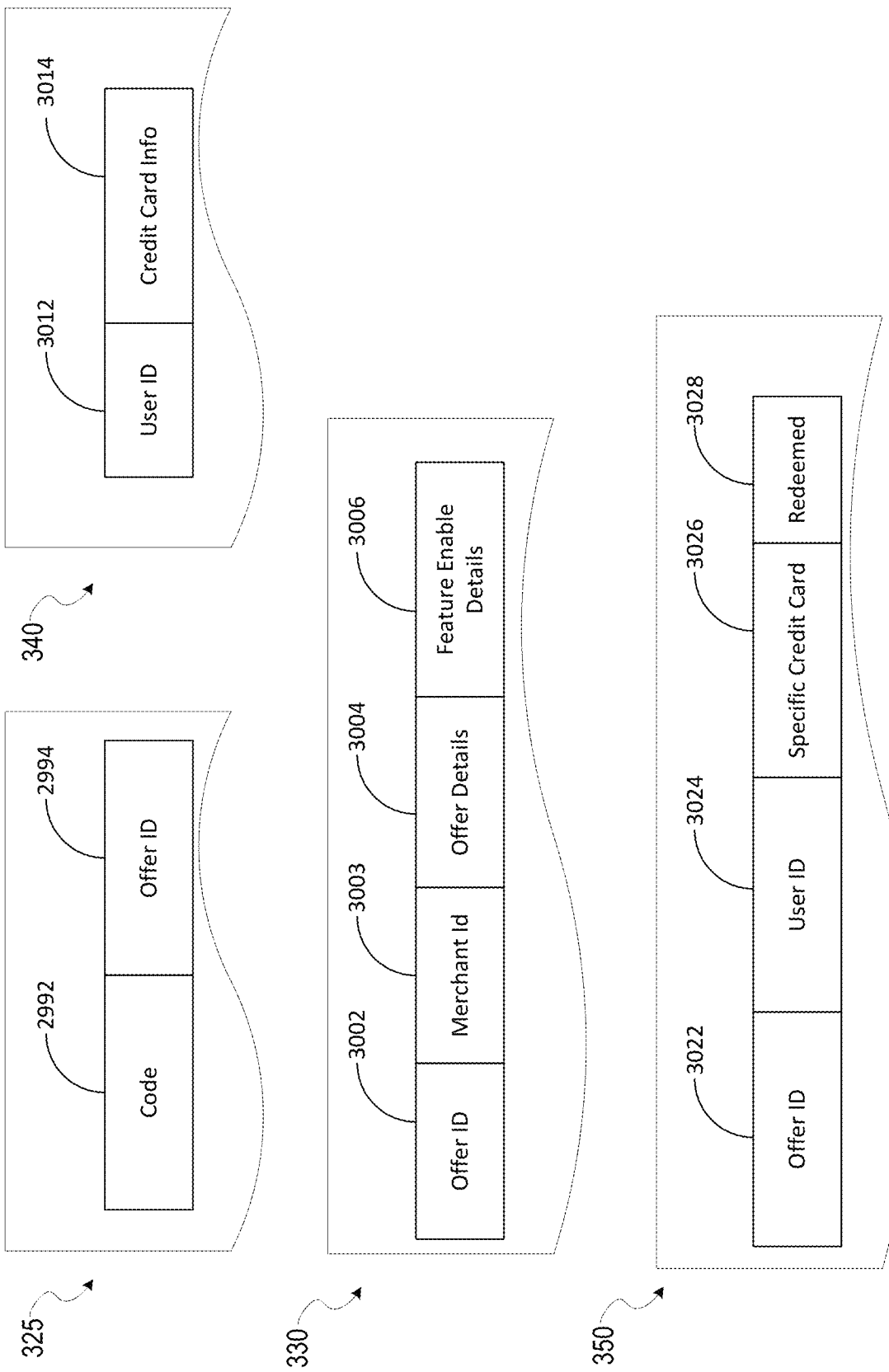
FIG. 4A shows an example relational design for a portion of the database 120.

FIG. 4A shows an example relational design for a portion of the database 120. The embodiment of the database 120 of FIG. 4A shows a code mapping table 325, offer table 330, a user table 340, and a claimed offer table 350. The offer table 330 includes an offer id 3002, merchant identifier 3003, offer details 3004, and feature enable details 3006 for an offer represented by a row of the offer table 3000. The offer id 3002 uniquely identifies the offer, and may be used in other tables to cross reference the offer. The merchant identifier 3003 uniquely identifies a merchant associated with the offer. The offer details column 3004 may comprise multiple columns in some aspects. The offer details column 3004 may include information on the nature of the offer, for example, merchant information, discount information, qualifying item information, and the like. The feature enable details column 3006 may include multiple columns in some aspects. The feature enable details column 3006 may define one or more features of a social network, such as a social network provided by the social network system 116. For example, in some aspects, the feature enable details column 3006 may identify one or more filters, videos, stories, or other social network capabilities to be enabled when the offer (identified by offer id 3002) has been redeemed.

The user table 340 includes a user identifier 3012 and credit card information 3014. In some aspects, the credit card information 3014 may provide information on multiple credit cards (e.g. number, expiration date, code) available for payments by the user (e.g. 3012).

The claimed offer table 350 includes an offer id column 3022, user id table 3024, specific credit card information for a credit card associated with the offer (e.g. 3022), and an indicator of whether the claimed offer has been redeemed 3028. There may be multiple rows in the claimed offer table 3050 for one or more offers in the offer table 330. For example, if an offer is claimed by multiple users, there may be multiple entries in the claimed offer table for each user. The combination of the offer id 3022 and user id 3024 uniquely identifies a claimed offer in the claimed offer table 350.

FIG. 4B shows an example relational design for a portion of the database 120. FIG. 4B includes a merchant table 360 and a feature table 370. The merchant table 360 may include a merchant identifier 362 and merchant interface information 364. The merchant identifier 362 may provide for cross referencing with the merchant identifier 3003, included in the offer table 330. The merchant interface information 364 may define information needed for the social network system 116 to interface with systems maintained by a particular merchant. For example, the merchant interface information 364 may include hostnames, protocol identifiers, IP addresses, uniform resource locators, or other information necessary to perform electronic communications with merchant systems.

Figure 4C:
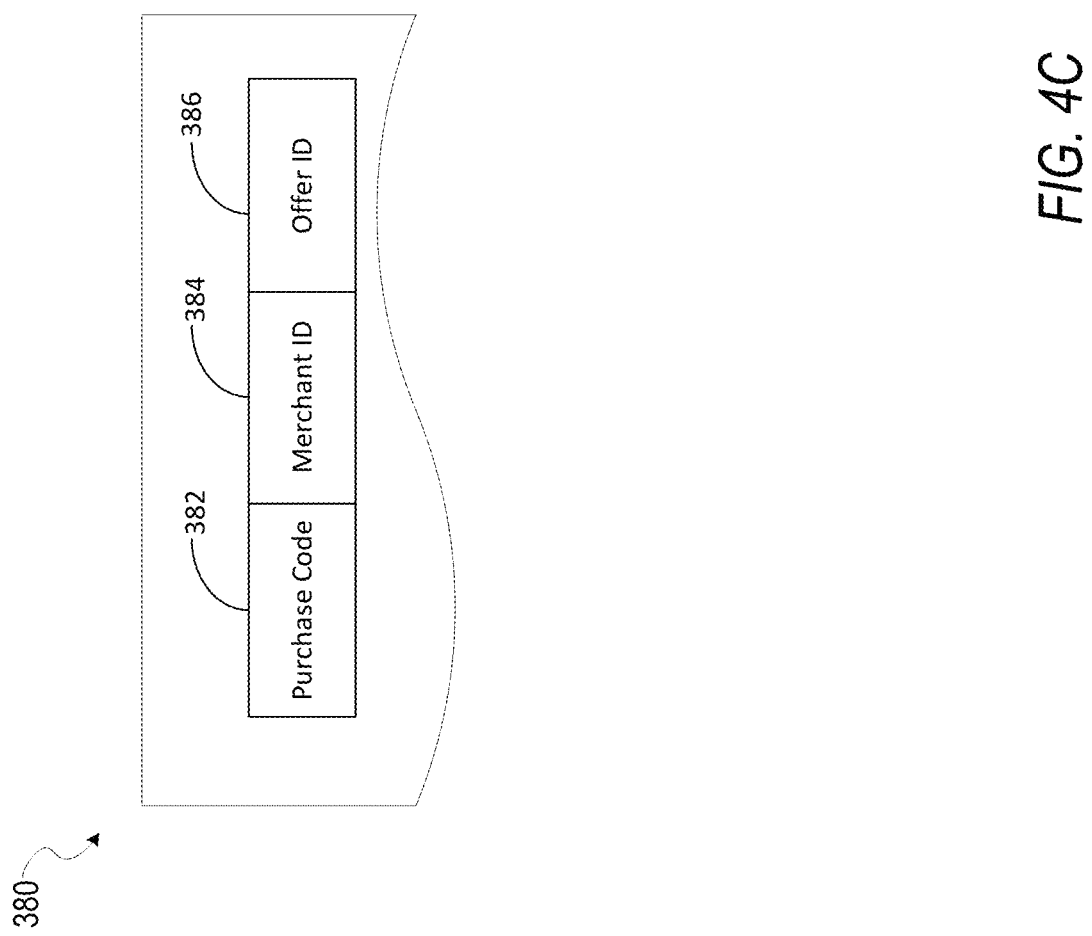
FIG. 4C shows an example relational design for a portion of the database 120.

FIG. 4C shows an example relational design for a portion of the database 120. FIG. 4C includes a purchase code table 380. The purchase code table 380 provides an association between purchase codes and merchants. Thus, when the social network system 116 receives a purchase code 382, it can identify the merchant 384. The merchant identifier 384 may be cross referenced with other merchant identifiers, such as any of merchant identifiers 3003, and/or 362. The purchase code table 380 may also include an offer identifier 386. The offer identifier 386 may identify an offer to be used with the purchase code 382. The offer identifier 386 may be cross referenced with any of the other offer identifiers discussed above.

Figure 5:
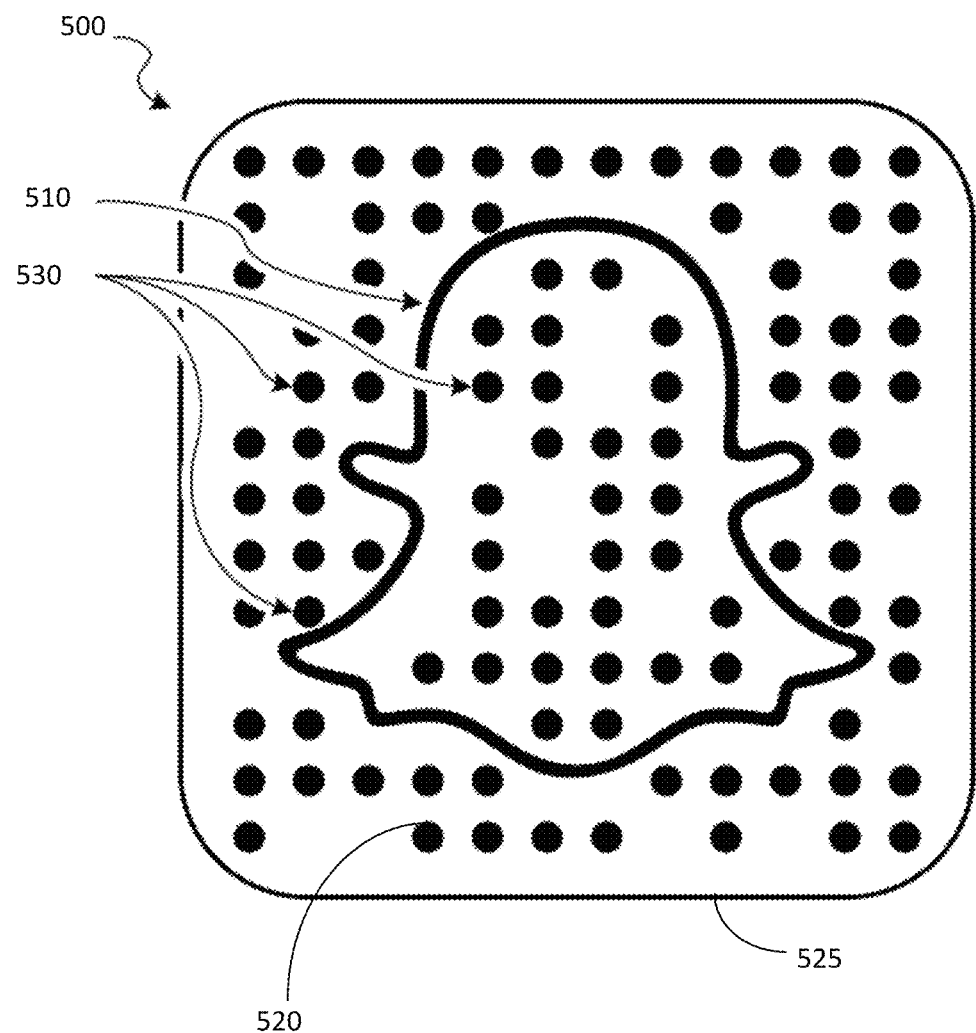
FIG. 5 shows an exemplary optical code.

FIG. 5 shows an exemplary optical code. The exemplary optical code 500 employs a custom graphic for a finder pattern or an alignment pattern. Optical code 500 includes a custom graphic 510 (e.g., a company logo), and markings 520 that represent data encoded into the optical code. In this example, the custom graphic 510 is a company logo such as a "ghost" logo. It will be appreciated that a "ghost" logo is merely an example custom graphic and other graphics, icons, or symbols can be employed as a finder pattern or alignment pattern using the techniques described herein. Other example custom graphics used as a functional pattern can include designs with multiple paths, multiple polygons, multiple aesthetic elements, or other design features.

In alternative embodiments, the custom graphic 510 may be different from a company logo. The markings 520 are in this example dots that are arranged in a pattern with a particular spacing or positioning readable by a machine. Although the optical code 500 shows the markings 520 as dots, other shapes and marks can be employed (e.g., squares or asymmetric shapes of various geometries). The markings 520 can be arranged in a uniform pattern or a non-uniform pattern. In some instances, the marks can be of different sizes or a uniform size. Additionally, the markings 520 can be in a predetermined arrangement or an arrangement that is dynamically determinable when decoding data from the markings. In some embodiments, the custom graphic 510 and the markings 520 can be surrounded by a bounding shape, such as an outer box 525. Although the outer box 525 of the diagram 500 is shown as a square with rounded corners, the outer box 525 can be in the form of a variety of other shapes with various geometries.

Figure 6:
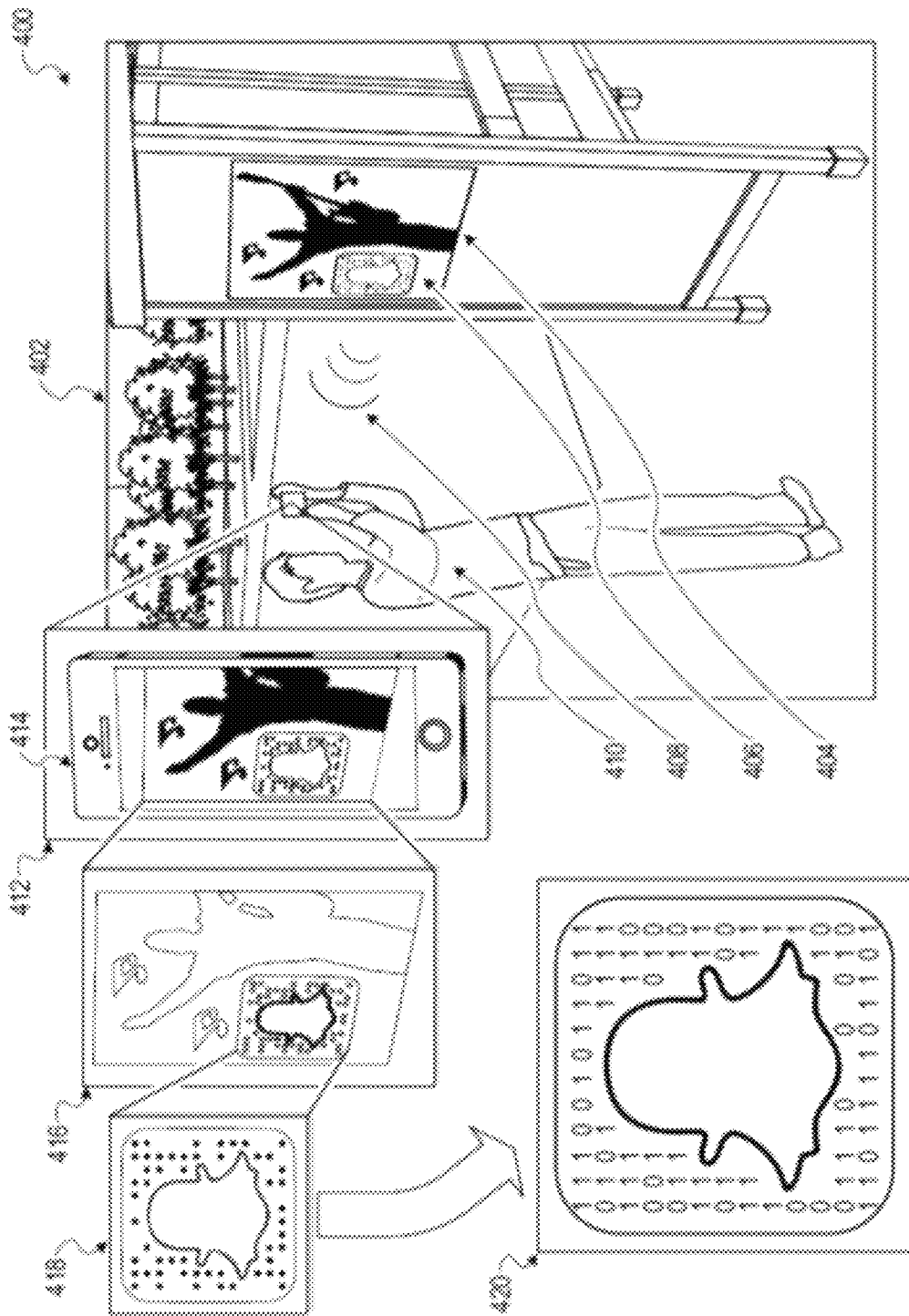
FIG. 6 shows an exemplary use of a optical code to obtain product information.

FIG. 6 is an overview of a particular example embodiment of identifying and decoding an optical code to identify a merchant offer. In various aspects, the optical code may include a custom graphic as discussed above. The example embodiment of FIG. 6 as described with reference to an example code 406 which is similar in arrangement to the example optical code 500 described with reference to FIG. 5. In the diagram 400, a scene 402 illustrates an offer 404 that includes an optical code 406 and a user 410. In the example embodiment of FIG. 6, the offer 404 is displayed as a printed advertisement carried by a physical structure in a public space. It will be appreciated that the offer that includes the optical code 406 can in other embodiments be displayed in a variety of manners such as on a user device display, a computer display, woven or otherwise affixed to an article of clothing or another product, or included in a variety of printed items. Callout 412 portrays an enlarged view of a portion of the scene 402. The callout 412 includes a client device 102 of the user 410 that includes an optical sensor (e.g., a camera sensor of a smart phone) operable to detect an optical signal 408 of the optical code 406.

In an example embodiment, the client device 102 captures an image of the offer 404 that includes the optical code 406. Note that the user 410 in this example embodiment need not capture the offer 404 in its entirety but can instead capture an image focused more narrowly on the optical code 406. From the optical code 406, the offer management system 206 identifies the offer 404. The user 410 may then later redeem the offer 404 at a merchant providing the offer, the details of which will be discussed further below.

Figure 7:
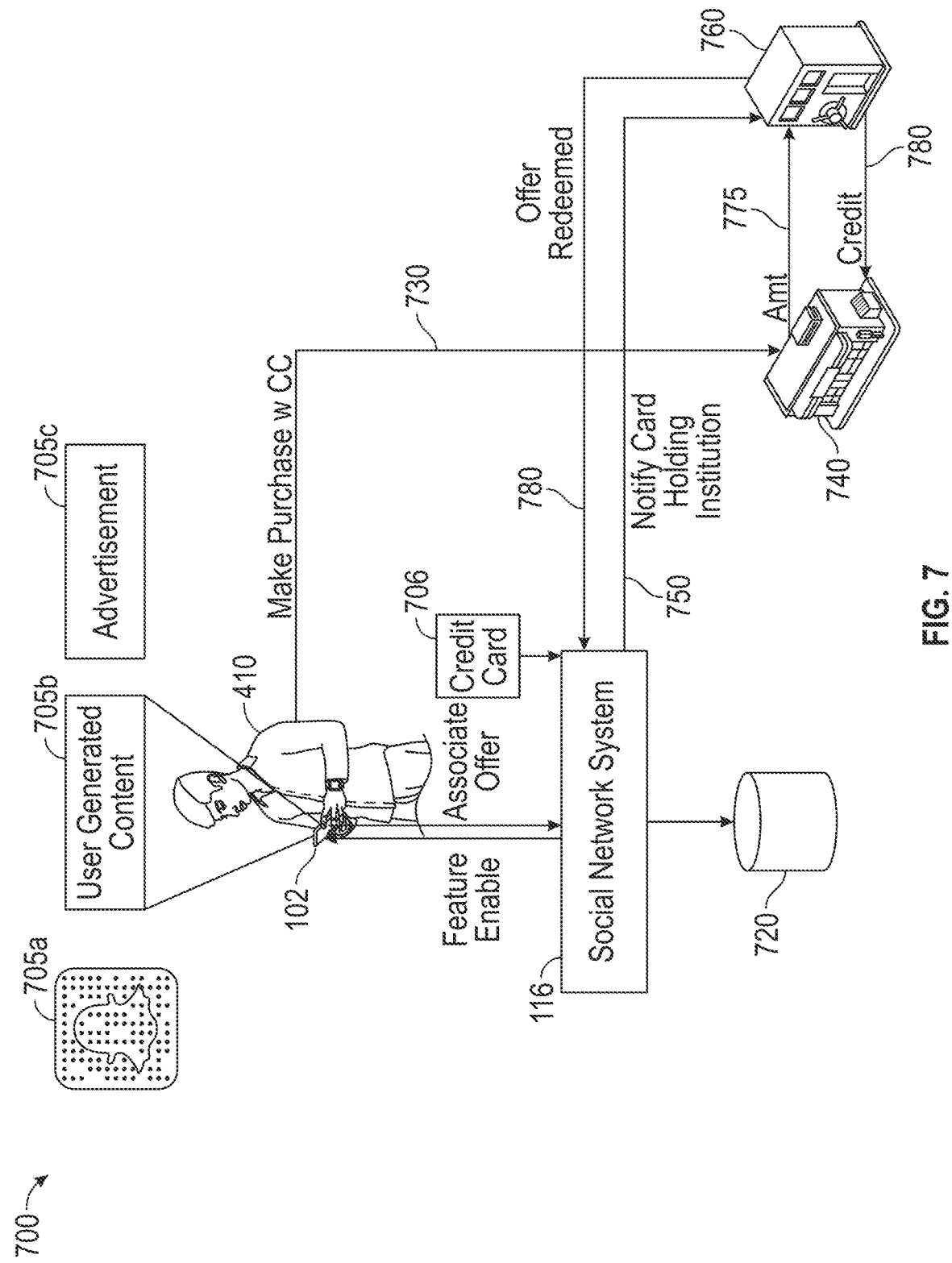
FIG. 7 is a data flow diagram showing a data flow that may be implemented in one or more of the disclosed embodiments.

FIG. 7 is a data flow diagram showing a data flow that implemented in one or more example embodiments. The data flow 700 shows that the user 410 in this example embodiment captures an image using their client device 102. The image represents an identifying code (e.g. 406) for an offer (e.g. 404). The offer may come in a variety of forms, including a code 705a, user generated content 705b, or an advertisement 705c. Any of the code 705a, user generated content 705b, or advertisement 705c may include a code or other optically encoded data value that may be extracted from the captured image. The data flow 700 of FIG. 7 will be discussed in conjunction with example portions of the database 120, described above with respect to FIGS. 4A-C.

Thus, when the user 410 scans the code, the disclosed embodiments may identify an offer (e.g. from the code). For example, in some aspects, some of the disclosed embodiments may consult a code mapping table 325, shown in FIG. 4A. The code mapping table 325 may map a code 2992, read from an image captured by the client device 102, to an offer identifier 2994. The code 2992 may be equivalent to the code 705a shown in FIG. 7.

The user 410 may then claim the offer by associating the offer (identified via offer id 2994) with a credit card 706 via the social network system 116. The social network system 116 may store information relating to the claimed offer, the user 410, and the credit card 706 in a claimed offer table 350, discussed above with respect to FIG. 4A.

The social network system 116 may also notify an institution 760 supporting or holding the credit card 706 via one or more messages 750 of the claimed offer. For example, the one or more messages 750 may indicate to the institution 760 that the credit card 706 is associated with the particular offer. The institution 760 may store this information for later use.

Later, the user 702 may make a purchase at a merchant 740 using the credit card 706. Since the institution 760 is aware that the credit card 706 is associated with the offer, the institution 760 processes the purchase according to the offer. This may include charging the credit card account a full amount 775 of the purchase. The institution 760 may also process a credit 780 to the merchant 780 consistent with the offer. For example, if the offer provides a 10% discount, the merchant 740 may be notified of the 10% discount for the amount 775. This discount may then be applied to the credit card 706 as well. The institution 760 may further notify the social network system 116 that the offer has been redeemed via one or more messages 780. In response to the offer being redeemed, the social network system 116 may consult the claimed offer table 350 and mark the claimed offer as redeemed. The social network system 116 may also enable one or more features of the social network system available to the user's client device 102. For example, in some aspects, one or more image filters may be enabled in response to the offer being redeemed. The features to enable may be determined from the offer table 3000, discussed below with respect to FIG. 7.

Figure 8:
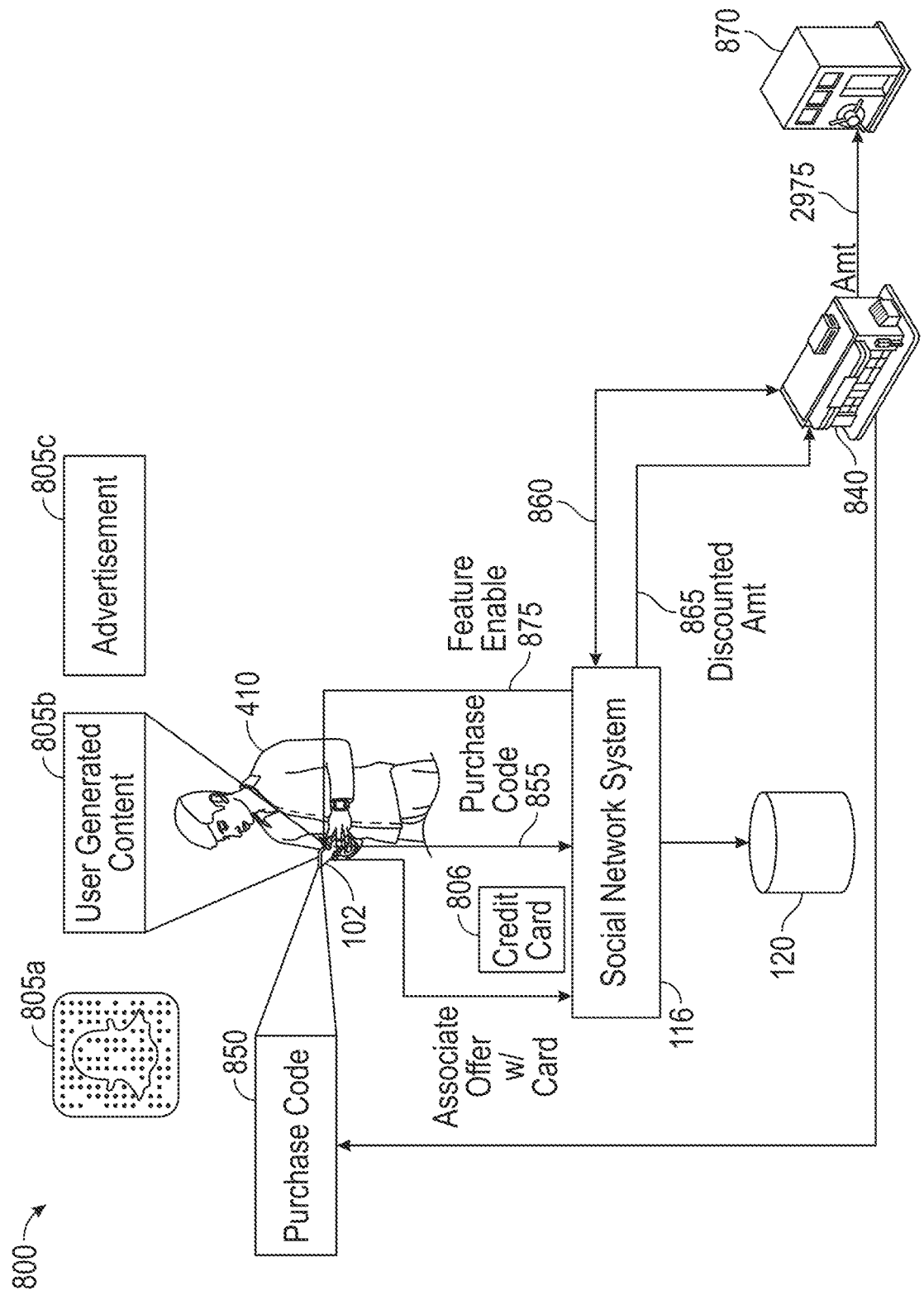
FIG. 8 shows an example dataflow that may be implemented in some of the disclosed embodiments.

FIG. 8 shows an example dataflow that may be implemented in some of the disclosed embodiments. Dataflow 800 shows a user, 410 using a client device 102. The user 410 captures an image of an offer. Similar to the dataflow of FIG. 7, the offer may come in various forms. For example, the offer may be in the form of a code 805a, user generated content 805b, or advertisement 805c. Scanning the offer in one of the offer forms 805a-c may cause the client device 102 to transmit a code embedded in the offer 805a, user generated content 805b, or advertisement 805c to the social network system 116. The user 410 may also associate a credit card 806 with the offer. In some aspects, the offer may be claimed by the user without use of the camera. For example, an advertisement or other user generated content may be presented to the user 410. By entering a particular input, the user may claim an offer associated with the advertisement or user content. For example, particular content may prompt the user "swipe up to claim this offer!." If the user swipes up, then the offer is claimed.

Later, the user 410 may seek to purchase items at a merchant 840. The merchant may display a purchase code 850. In response, the user 410 may scan the purchase code 850 with the client device 102. The client device 102 may transmit the purchase code to the social network system 116 via message 855. The social network system 116 may then communicate with the merchant 840 regarding the purchase transaction in one or more messages 860. For example, the social network system 116 may transmit the purchase code 850 to the merchant 840. The merchant may communicate back to the social network system indicating an amount of the purchase. The social network system 116 may then authorize the merchant 840 to charge one of the user's 702 credit cards 806 for a discounted amount 865. The merchant 840 may then charge the user's 802 credit card 806 via a credit card processor 870. When the purchase transaction has been completed, the social network system 116 may transmit one or more messages 875 to enable one or more features associated with the redeemed offer.

Figure 9A:
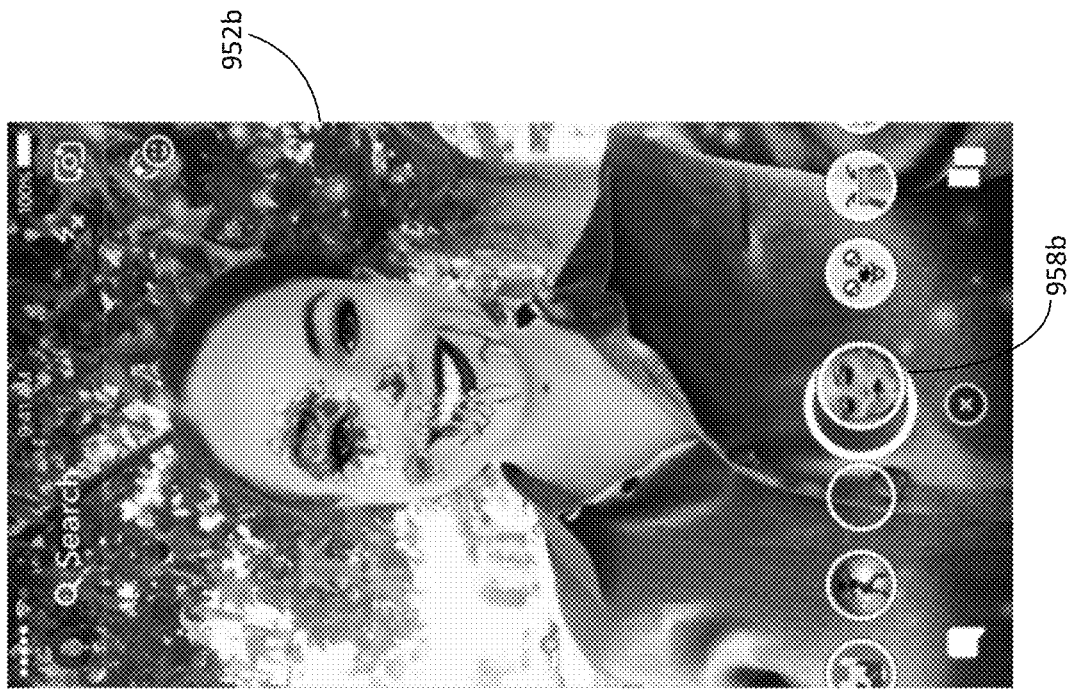
FIG. 9A shows a user interface that may apply one or more image filters to an image.
Figure 9A:
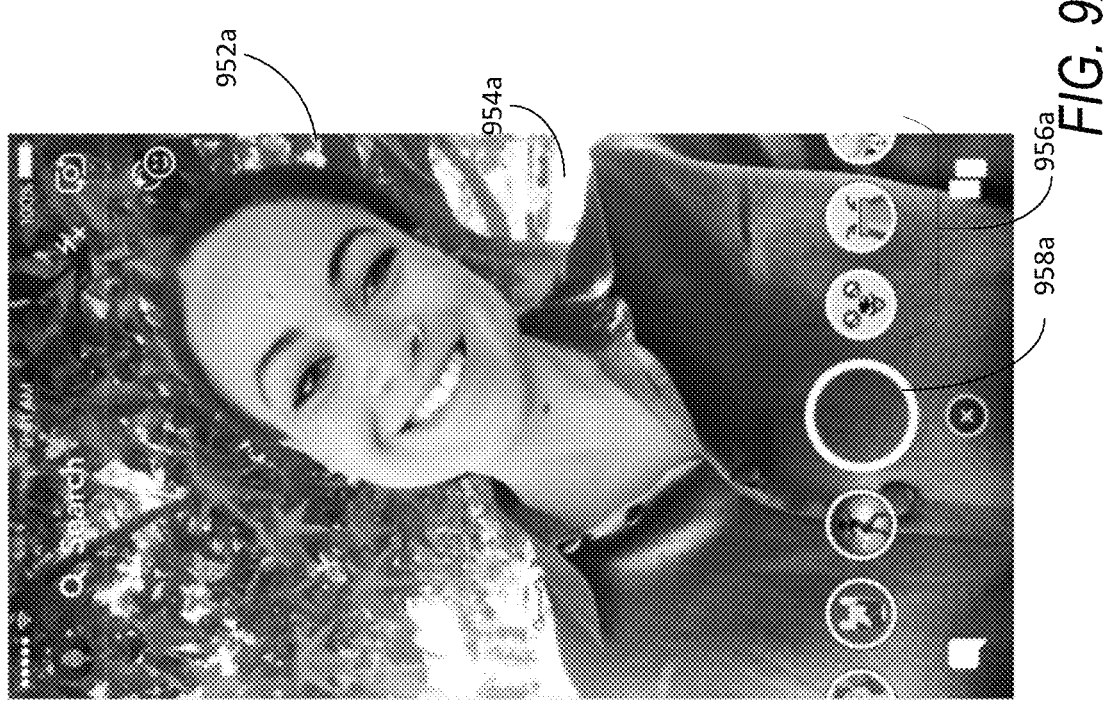

FIG. 9A shows a user interface that may apply one or more image filters to an image. FIG. 9A shows two versions of a user interface 950, shown as 952a and 952b. The version 952a shows an image 954a before application of an image filter, which may be selected from image filter list 956a. Since no image filter is selected in version 952a, the active filter indication 958a is empty. The second version 952b shows the user interface 950 after an image filter has been applied to the image 954a, shown as 954b. The active filter indication 958b shows which image filter from the list 956a was applied to the image 954b. As discussed herein, some embodiments of this disclosure may add one or more image filters to the image filter list 956a shown in FIG. 9A in some aspects.

Figure 9B:
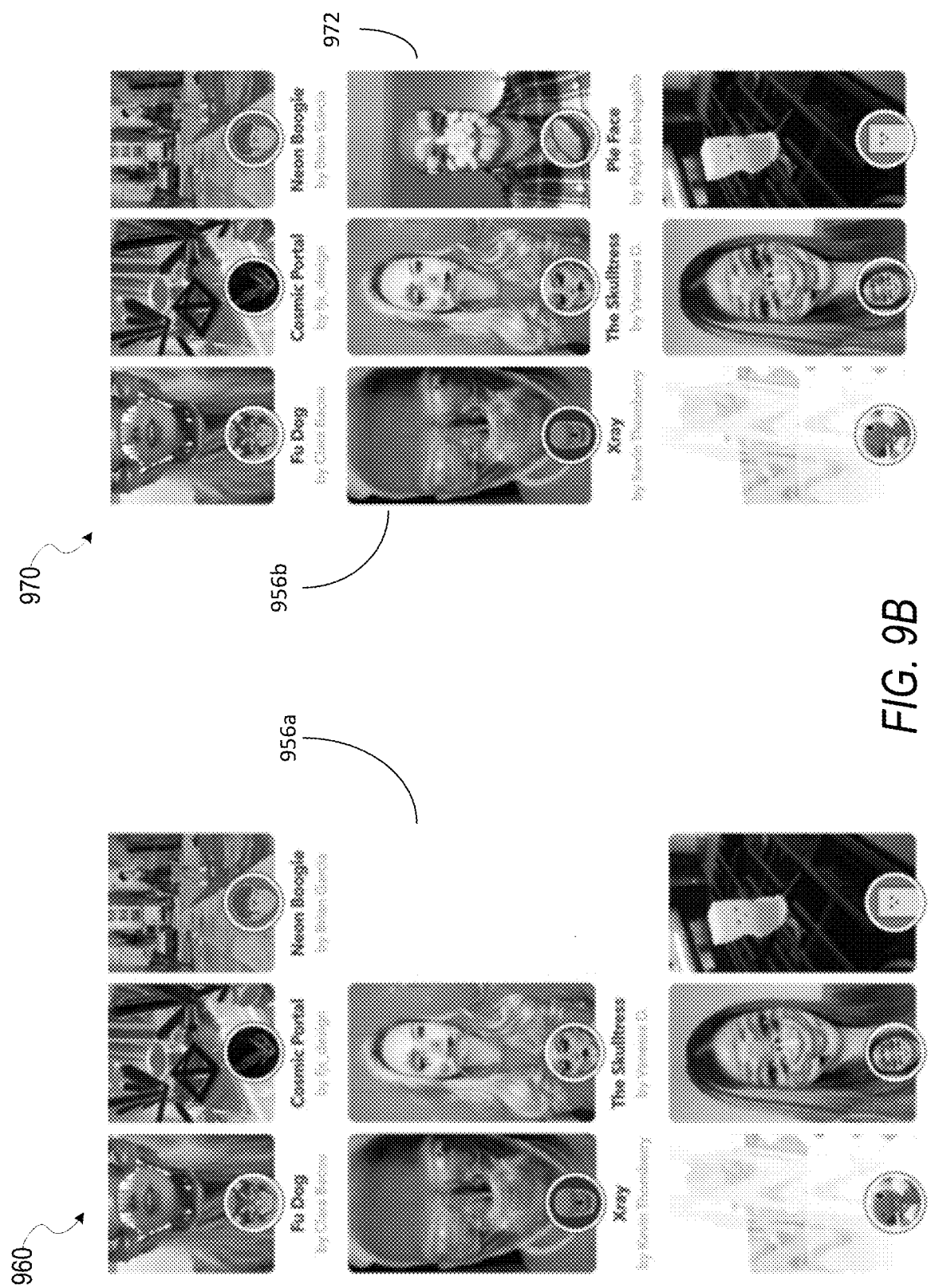
FIG. 9B shows an expanded view of an image filter list.

FIG. 9B shows an expanded view 960 of the image filter list 956a. In some aspects, the expanded view 960 may be displayed in response to a selection or swipe gesture over the image filter list 956a. Expanded view 960 shows a first image filter list 956a. A second expanded view 970 shows a second image filter list 956b. The second image filter list 956b includes an additional image filter 972 that is not present in the image filter list 956a shown in the expanded view 960. In some aspects, embodiments of this disclosure may augment image filter list 956a to include additional image filters, such as image filter 972 shown in expanded view 970, based on, for example, completion of a purchase that includes use of an offer claimed via embodiments of this disclosure. For example, use of a particular vendor's offer may provide a new image filter (e.g., 972) that is associated with the particular vendor. For example, the new image filter may add the particular vendor's name and/or logo to an image to which the image filter is applied.

Figure 10:
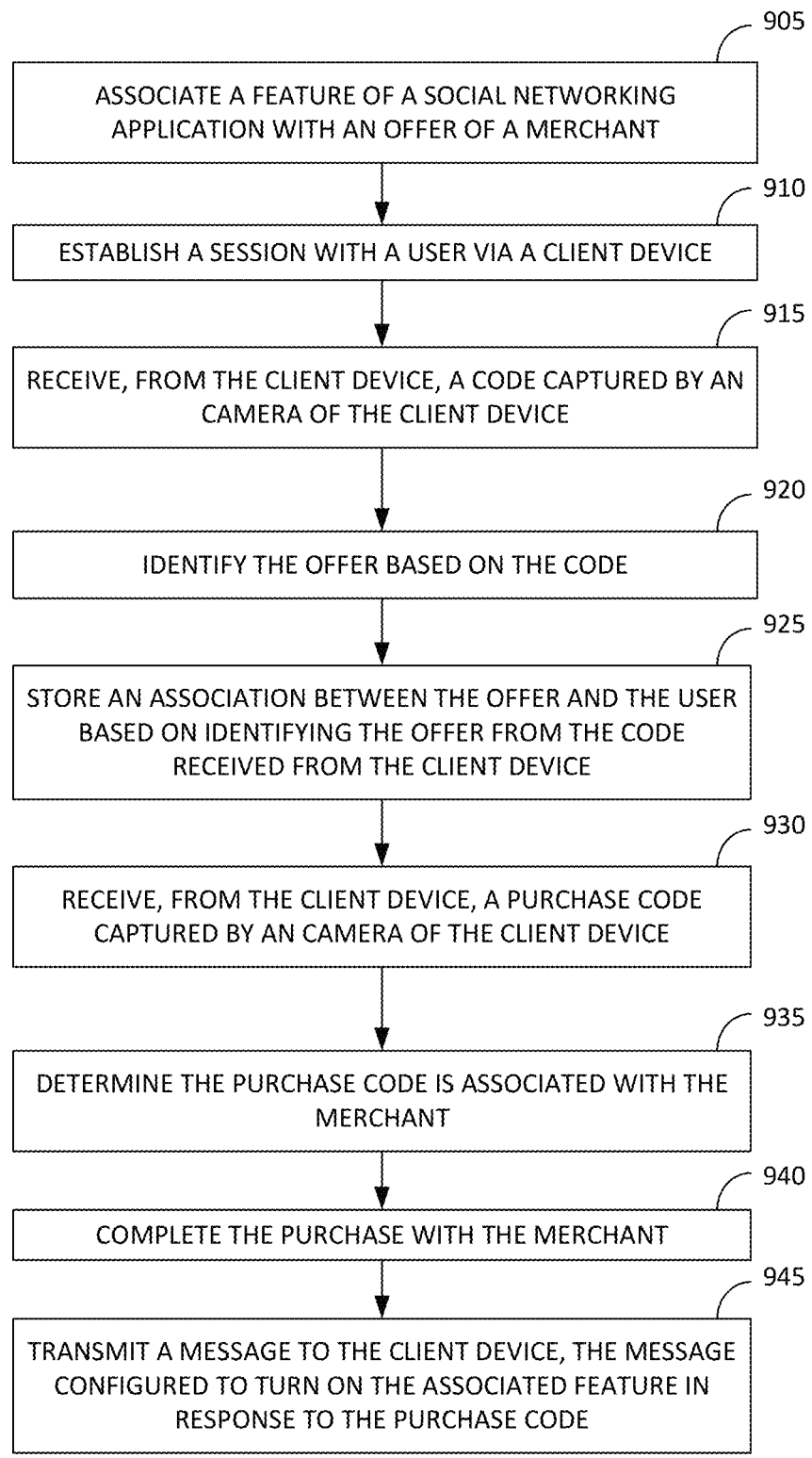
FIG. 10 is a flowchart of a method for configuring a social network application in response to a redemption of an offer.

FIG. 10 is a flowchart of a method for configuring a social network application in response to a redemption of an offer. In some aspects, FIG. 10 may be performed by one or more of the offer management system 206, payment system 208, or dynamic feature system 210. For example, in some aspects, processing circuitry may be configured to instructions stored in a hardware memory to perform one or more of the functions discussed below with respect to FIG. 10.

In block 905, a feature of a social networking application is associated with an offer of a merchant. For example, as discussed above, in some aspects, an offer table 330 may identify an offer (e.g. 3002) and associate the offer with one or more features of a social network (e.g. 3006) and a merchant (e.g. 3003). The features may provide additional functionality to users of the social network. For example, one feature may be a single image filter that may be made available in a user's social network session. When applied to an image, the filter may add additional content to the image. For example, the filter may add certain defined words to an image. In some aspects, the same filter or a second filter indicated by field 3006 may also add an optical code to the image that maps to the offer of the merchant. This may provide for future sharing of the offer with other social network users, as discussed below. In some aspects, block 905 may add an entry to the code mapping table 325, that records an association between the optical code and the offer.

In block 910, a session is established with a user. In some aspects, establishing a session with a user may include receiving authentication information from the user, such as a user name and password for a user account, and comparing the received information to second authentication information stored in a user account database. If the received authentication information matches the second authentication information, block 910 may establish a session for the user. This session may associate the user's account with a particular client device, such that input and output for the session is directed to the client device associated with the user account.

In block 915, a code is received from the client device via the session. In some aspects, the code was captured by a camera of the client device. As discussed above with respect to FIG. 6, a user (e.g. 410) may capture an image of an offer (e.g. 404). An optical code (e.g. 406) may be embedded in the offer. In some other aspects, the code may be obtained by the client device based on a particular input received at the client device. For example, in some aspects, an offer may be claimed by a user by providing particular input in response to content. For example, an advertisement or other content may be presented to a user on a client device indicating that if the user swipes in a particular manner over the content, they can claim an offer represented by the content. Once the offer is claimed by the user, the code identifying the claimed offer may then be transmitted by the client device to the social network system 116, and/or received in block 915.

In block 920, the offer is identified based on the code. In some aspects, block 920 identifies the offer by searching for the offer based on the code, for example, in a database or data store. As discussed above, some aspects may maintain a code mapping table (e.g. 325) that provides an offer (e.g. 2994) based on a code (e.g. 2992).

In block 925, an association between the offer and the user and/or the user account is stored based on identifying the offer from the code received from the client device. For example, as discussed above, a claimed offer table (e.g. 350) may be maintained in some embodiments. The claimed offer table (e.g., 350) may provide an association between the user (e.g. 3024), their account, and the offer (e.g. 3022). Block 925 may write an entry (e.g. row) into the claimed offer table recording the association between the user and the offer. The entry may indicate that the offer is not redeemed (e.g. 3028). The entry may also indicate a specific credit card to use with the offer in some aspects (e.g. 3026).

In block 930, a purchase code is received from the client device. The purchase code may have been captured by a camera included in the client device. The client device may then transmit the purchase code to a server running the social network system 116.

Block 935 determines that the purchase code is associated with a particular merchant. In some aspects, the determination may be made via a database lookup. For example, some implementations may maintain a purchase code mapping table (e.g. 380) that provides a mapping from purchase codes to merchants. The mapping table may also indicate a particular offer that is associated with the purchase (e.g. 386). Once the offer has been identified, some implementations may also maintain an offer table (e.g. 330) that maintains a mapping from offers to merchants.

In block 940, the purchase may be completed with the merchant. In some aspects, block 940 includes transmitting a message to a merchant system. In some aspects, the merchant system may be identified via the merchant table 360. For example, block 940 may identify merchant interface information (e.g. 364) based on the merchant identified in block 935 (e.g. 362). The merchant interface information may include hostname(s) and/or IP addresses for a system maintained by the merchant that provides for the completion of ecommerce transactions. In some aspects, block 940 may include transmitting a message to the merchant system, the message indicating the purchase code received in block 930. In response, the merchant system may send a message back indicating an amount of the purchase associated with the purchase code. In some aspects, block 940 may then compute a new purchase amount based on the amount received from the merchant and the offer. For example, the offer may indicate a discount for example. In some aspects, the discount may be a percentage discount off a total amount of the purchase, or may relate to particular items included in the purchase. In this case, the merchant may transmit a list of items to be purchased, and this list may be received (e.g. from the social network system 116) in block 940. Block 940 may then determine whether an item to which the offer applies is included in the list of items to be purchased. Regardless of the particular offer, the purchase transaction is then completed in accordance with the offer. Block 940 may determine a final amount of the purchase, based on the amount received from the merchant, the purchase list in some aspects, and the offer. Block 940 may then transmit authorization for the merchant to charge a credit card of the user for a particular amount determined in accordance with the offer.

In block 945, a message is transmitted to the client device. The message is configured to turn on a feature of a social network. The feature may be associated with the offer. The transmission of the message may be in response to a completion of the purchase transaction with the merchant, or at least in response to a determination that the purchase code, received from the client device, is associated with the merchant.

Software Architecture

Figure 11:
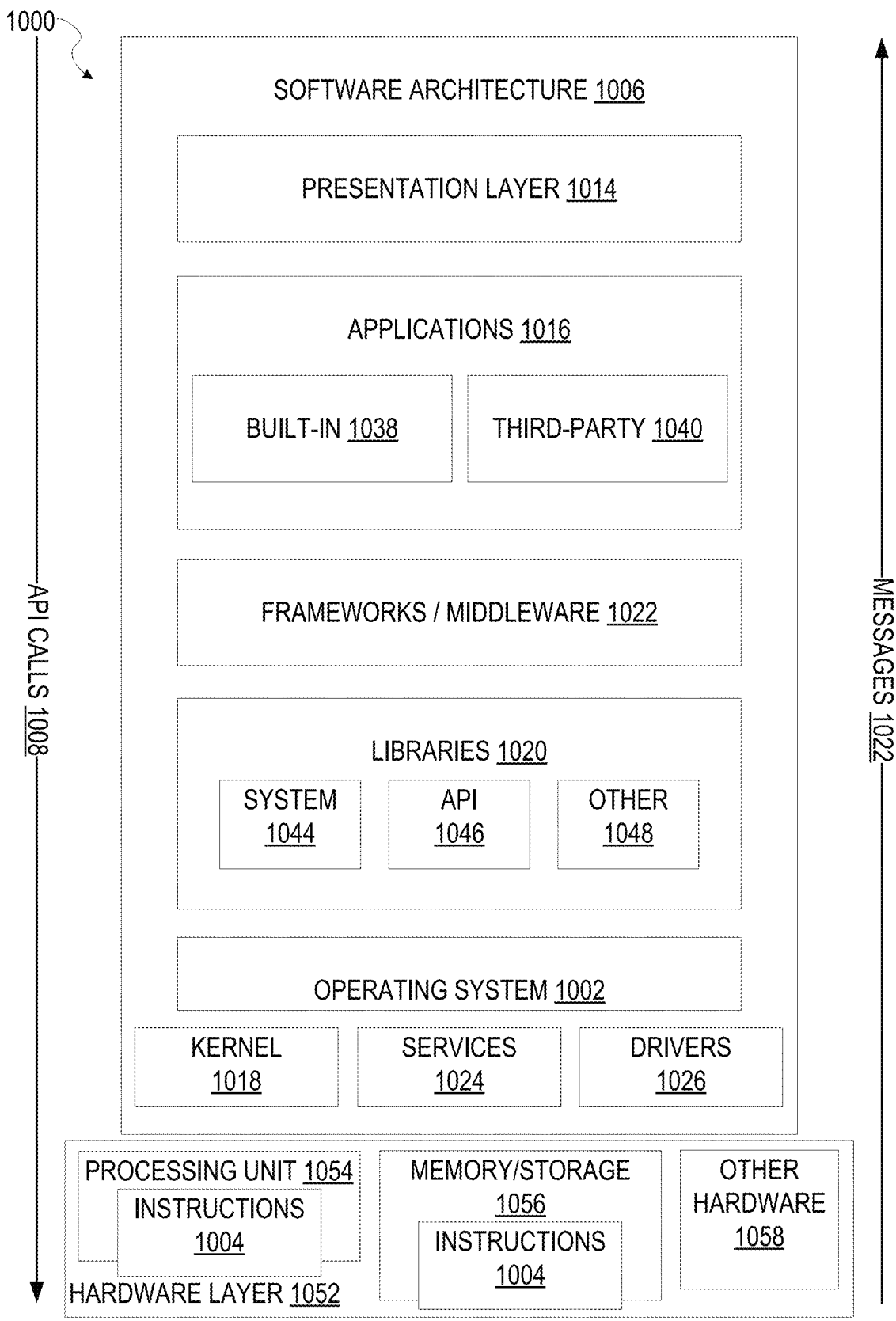
FIG. 11 is a block diagram illustrating an example software architecture.

FIG. 11 is a block diagram illustrating an example software architecture 1006, which may be used in conjunction with various hardware architectures herein described. FIG. 11 is a non-limiting example of a software architecture and it will be appreciated that many other architectures may be implemented to facilitate the functionality described herein. The software architecture 1006 may execute on hardware such as a machine 1100 of FIG. 12 that includes, among other things, processors 1004, memory/storage 1006, and I/O components 1018. A representative hardware layer 1052 is illustrated and can represent, for example, the machine 1100 of FIG. 12. The representative hardware layer 1052 includes a processing unit 1054 having associated executable instructions 1004. The executable instructions 1004 represent the executable instructions of the software architecture 1006, including implementation of the methods, components, and so forth described herein. The hardware layer 1052 also includes memory and/or storage 1056, which also have the executable instructions 1004. The hardware layer 1052 may also comprise other hardware 1058.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 11, the software architecture 1006 may be conceptualized as a stack of layers where each layer provides particular functionality. For example, the software architecture 1006 may include layers such as an operating system 1002, libraries 1020, frameworks/middleware 1018, applications 1016, and a presentation layer 1014. Operationally, the applications 1016 and/or other components within the layers may invoke API calls 1008 through the software stack and receive a response as messages 1010. The layers illustrated are representative in nature and not all software architectures have all layers. For example, some mobile or special-purpose operating systems may not provide a frameworks/middleware 1018 layer, while others may provide such a layer. Other software architectures may include additional or different layers.

The operating system 1002 may manage hardware resources and provide common services. The operating system 1002 may include, for example, a kernel 1022, services 1024, and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1020 provide a common infrastructure that is used by the applications 1016 and/or other components and/or layers. The libraries 1020 provide functionality that allows other software components to perform tasks in an easier fashion than by interfacing directly with the underlying operating system 1002 functionality (e.g., kernel 1022, services 1024, and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 provide a higher-level common infrastructure that may be used by the applications 1016 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. The third-party applications 1040 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1040 may invoke the API calls 1008 provided by the mobile operating system (such as the operating system 1002) to facilitate functionality described herein.

The applications 1016 may use built-in operating system functions (e.g., kernel 1022, services 1024, and/or drivers 1026), libraries 1020, and frameworks/middleware 1018 to create user interfaces to interact with users of the system. Alternatively, or additionally, in some systems interactions with a user may occur through a presentation layer, such as the presentation layer 1014. In these systems, the application/component "logic" can be separated from the aspects of the application/component that interact with a user.

Exemplary Machine

Figure 12:
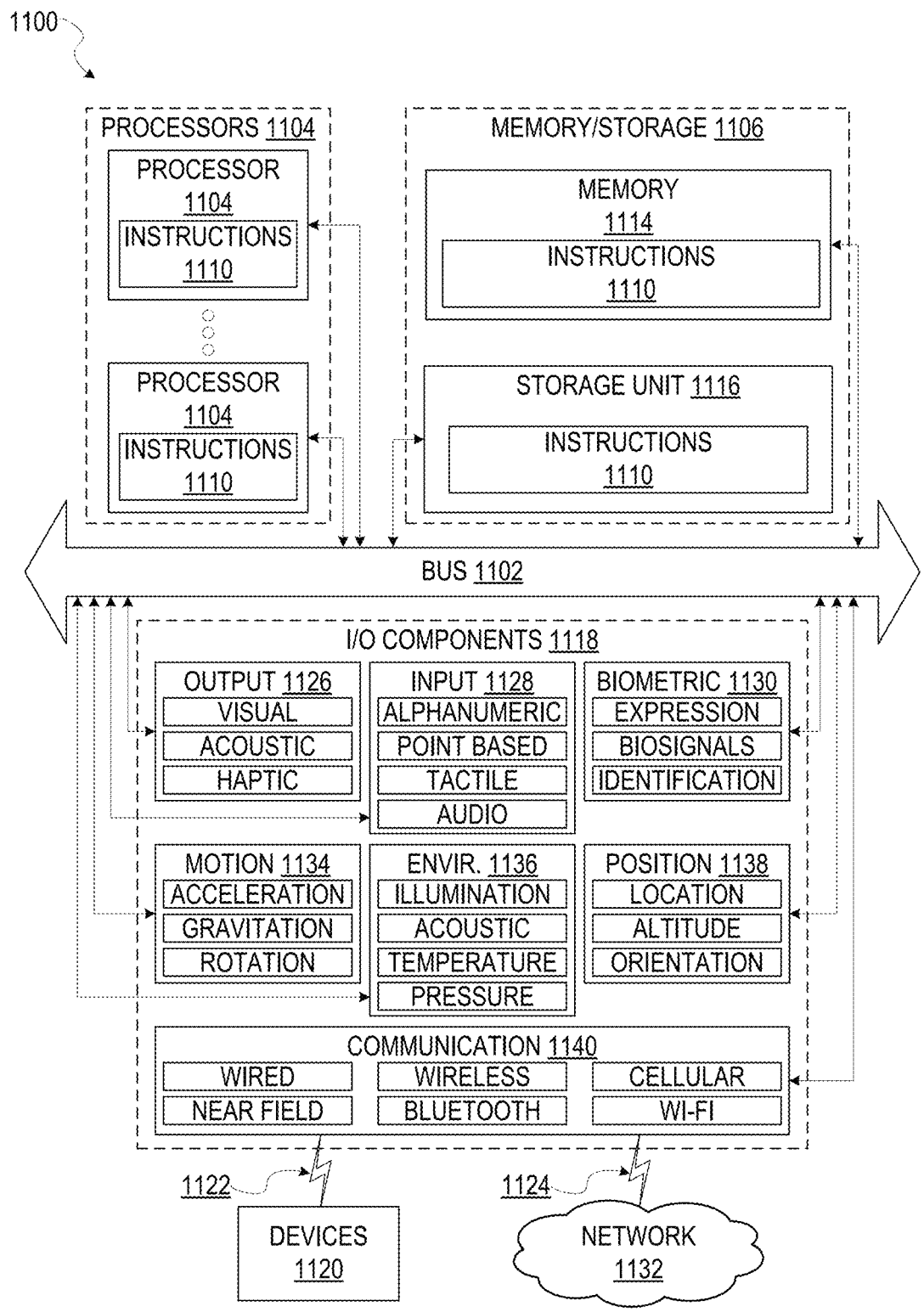
FIG. 12 is a block diagram illustrating exemplary components (also referred to herein as "modules") of a machine.

FIG. 12 is a block diagram illustrating exemplary components (also referred to herein as "modules") of a machine 1100. In some aspects, the machine is configured to read instructions from a machine-readable medium (e.g., a machine-readable storage medium) and perform any one or more of the methodologies discussed herein. Specifically, FIG. 12 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of the processors 1104 are examples of machine-readable media. In some aspect, the processors 410 and processors 1104 may be the same processors.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes transitory signals per se.

The I/O components 1118 may include a wide variety of components to provide a user interface for receiving input, providing output, producing output, transmitting information, exchanging information, capturing measurements, and so on. The specific I/O components 1118 that are included in the user interface of a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 12. The I/O components 1118 are grouped according to functionality merely for simplifying the following discussion and the grouping is in no way limiting. In various exemplary embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1128 may also include one or more image-capturing devices, such as a digital camera for generating digital images and/or video.

In further exemplary embodiments, the I/O components 1118 may include biometric components 1130, motion components 1134, environment components 1136, or position components 1138, as well as a wide array of other components. For example, the biometric components 1130 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1138 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via a coupling 1124 and a coupling 1122 respectively. For example, the communication components 1140 may include a network interface component or other suitable device to interface with the network 1132. In further examples, the communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a USB).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 1140, such as location via Internet Protocol (IP) geo-location, location via Wi-Fi® signal triangulation, location via detecting an NFC beacon signal that may indicate a particular location, and so forth.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document:

I claim:
1. A method comprising:
associating, by a social networking system, a feature of a social networking application with an offer of a merchant, the feature comprising a first image filter that adds graphical content associated with the offer of the merchant to an image after the image is captured by a camera of a client device and a second image filter that generates an optical code encoded with a data value;
mapping the offer of the merchant to the optical code;
establishing, by the social networking system, a session based on authentication credentials received for a user account from the client device;
receiving, by the social networking system, from the client device, via the session, an indication of selection of an offer code;
identifying, by the social networking system, the offer based on the offer code;
storing, by the social networking system, an association between the offer and the user account based on the identifying;
receiving, by the social networking system, from the client device via the session, a purchase code, the purchase code captured in a second image by the camera of the client device;
determining, by the social networking system, the purchase code is associated with the merchant;
completing, by a social networking system, a purchase with the merchant in accordance with the offer, the purchase identified by the purchase code;
activating, by the social networking system, the associated feature to add the graphical content and the optical code to an image captured by the camera of the client device, in response to completing the purchase in accordance with the offer;
transmitting the optical code and a first message and in response to receiving a second message from the merchant indicating completion of the purchase.
2. The method of claim 1, wherein the indication of selection of an offer code comprises an image representing the offer code captured by the camera of the client device, or an input received by the client device selecting the offer code.

3. The method of claim 1, wherein the first image filter is available for application to one or more images in the user's session.

4. The method of claim 1, wherein completing the purchase with the merchant comprises:
transmitting the purchase code to the merchant;
receiving a purchase amount from the merchant;
applying the offer to the purchase;
generating an authorized amount based on the purchase amount and the application of the offer to the purchase; and
transmitting an authorization for the merchant to charge the user for the authorized amount.

5. The method of claim 4, the method further comprising receiving an indication from the client device associating a credit card with the offer, wherein the authorization for the merchant to charge the user is an authorization to charge the credit card based on the association between the credit card and the offer.

6. The method of claim 1, the method further comprises closing and reopening the session before the purchase code is received.

7. The method of claim 1, wherein the determining that the purchase code is associated with the merchant comprises searching a database for the purchase code, and identifying the merchant based on an association between the purchase code and the merchant stored in the database.

8. A system comprising:
hardware processing circuitry configured to perform operations comprising:
establishing a session based on authentication credentials received for a user account from a client device;
receiving, from the client device, via the session, an indication of selection of an offer code;
identifying an offer based on the offer code;
associating a feature of a social networking application with an offer of a merchant, the feature comprising a first image filter that adds graphical content associated with the offer of the merchant to an image after the image is captured by a camera of a client device and a second image filter that generates an optical code encoded with a data value;
mapping the offer of the merchant to the optical code;
storing an association between the offer and the user account based on the identifying;
receiving, from the client device via the session, a purchase code, the purchase code captured in a second image by the camera of the client device;
determining the purchase code is associated with the merchant;
completing a purchase with the merchant in accordance with the offer, the purchase identified by the purchase code;
adding the graphical content and the optical code to an image captured by the camera of the client device, in response to completing the purchase in accordance with the offer;
transmitting the optical code and a first message and in response to receiving a second message from the merchant indicating completion of the purchase.

9. The system of claim 8, wherein the indication of selection of an offer code comprises a second image representing the offer code captured by the camera of the client device, or an indication of a particular input received by the client device selecting the offer code.

10. The system of claim 8, the operations further comprising:
activating the associated feature to add the graphical content and the optical code to an image captured by the camera of the client device, in response to completing the purchase in accordance with the offer.

11. The system of claim 10, wherein the first image filter is available for application to one or more images in the user's session.

12. The system of claim 8, wherein completing the purchase with the merchant comprises:
transmitting the purchase code to the merchant;
receiving a purchase amount from the merchant;
applying the offer to the purchase;
generating an authorized amount based on the purchase amount and the application of the offer to the purchase; and
transmitting an authorization for the merchant to charge the user for the authorized amount.

13. The system of claim 12, the operations further comprising receiving an indication from the client device associating a credit card with the offer, wherein the authorization for the merchant to charge the user is an authorization to charge the credit card based on the association between the credit card and the offer.

14. The system of claim 8, the operations further comprises closing and reopening the session before the purchase code is received.

15. The system of claim 8, wherein the determining that the purchase code is associated with the merchant comprises searching a database for the purchase code, and identifying the merchant based on an association between the purchase code and the merchant stored in the database.

16. A non-transitory computer readable storage medium comprising instructions that when executed configure hardware processing circuitry to perform operations comprising:
establishing a session based on authentication credentials received for a user account from a client device;
receiving, from the client device, via the session, an indication of selection of an offer code;
identifying an offer based on the offer code;
storing an association between the offer and the user account based on the identifying;
associating a feature of a social networking application with an offer of a merchant, the feature comprising a first image filter that adds graphical content associated with the offer of the merchant to an image after the image is captured by a camera of a client device and a second image filter that generates an optical code encoded with a data value;
mapping the offer of the merchant to the optical code;
receiving, from the client device via the session, a purchase code, the purchase code captured in a second image by the camera of the client device;
determining the purchase code is associated with the merchant;
completing a purchase with the merchant in accordance with the offer, the purchase identified by the purchase code;
adding the graphical content and the optical code to an image captured by the camera of the client device, in response to completing the purchase in accordance with the offer;

transmitting the optical code and a first message and in response to receiving a second message from the merchant indicating completion of the purchase.

17. The non-transitory computer readable storage medium of claim 16, the operations further comprising:

activating the associated feature to add the graphical content and the optical code to an image captured by the camera of the client device, in response to completing the purchase in accordance with the offer.

18. The non-transitory computer readable storage medium of claim 16, wherein the indication of selection of an offer code comprises a second image representing the offer code that was captured by a camera of the client device, or an indication of a particular input received by the client device selecting the offer code.

* * * * *